(12) United States Patent
Kodemura et al.

(10) Patent No.: US 7,465,773 B2
(45) Date of Patent: Dec. 16, 2008

(54) POLYMERIZABLE COMPOSITION AND FORMED ARTICLE USING THE SAME

(75) Inventors: Junji Kodemura, Tokyo (JP); Kazunori Tohshima, Tokyo (JP)

(73) Assignee: Zeon Corporation, Tokyo (JP)

( * ) Notice: Subject to any disclaimer, the term of this patent is extended or adjusted under 35 U.S.C. 154(b) by 8 days.

(21) Appl. No.: 10/567,116

(22) PCT Filed: Aug. 4, 2004

(86) PCT No.: PCT/JP2004/011507

§ 371 (c)(1),
(2), (4) Date: Feb. 3, 2006

(87) PCT Pub. No.: WO2005/012427

PCT Pub. Date: Feb. 10, 2005

(65) Prior Publication Data

US 2006/0211809 A1      Sep. 21, 2006

(30) Foreign Application Priority Data

Aug. 4, 2003    (JP)    ................. 2003-286271

(51) Int. Cl.
*C08F 4/44*    (2006.01)
(52) U.S. Cl. .................... 526/129; 526/161; 526/171; 526/281; 526/282; 526/318
(58) Field of Classification Search ............. 526/129, 526/161, 171, 281, 282, 318
See application file for complete search history.

(56) References Cited

U.S. PATENT DOCUMENTS 4,418,178 A    11/1983   DeWitt

FOREIGN PATENT DOCUMENTS

| EP | 0 305 933 A2 | 3/1989 |
|---|---|---|
| JP | 59-81316 A | 5/1984 |
| JP | 63-260921 A | 10/1988 |
| JP | 1-304113 A | 12/1989 |
| JP | 1-304115 A | 12/1989 |
| JP | 2-269733 A | 11/1990 |
| JP | 09-183833 A | 7/1997 |
| JP | 2755642 B2 | 3/1998 |
| JP | 2859300 B2 | 12/1998 |
| JP | 2002-179889 A | 6/2002 |
| WO | WO-99/37701 A1 | 7/1999 |
| WO | WO 9937701 A1 * | 7/1999 |
| WO | WO-00/46255 A1 | 8/2000 |

* cited by examiner

*Primary Examiner*—Robert D. Harlan
(74) *Attorney, Agent, or Firm*—Birch, Stewart, Kolasch & Birch, LLP

(57) ABSTRACT

A polymerizable composition which comprises a cycloolefin monomer (A), a filler (B), a polymer (C) having a carboxyl group or a carboxylic acid anhydride group and having an acid value of 0.1 to 100 mgKOH/g, and a metathesis polymerization catalyst (D). The polymerizable composition comprises a cycloolefin monomer and a large amount of a filler, and has a low viscosity and is excellent in fluidity, and further can provide a molded product which is excellent in the lowness of dielectric constant, the lowness of dielectric loss tangent, the lowness of linear expansion coefficient, high heat resistance and adhesiveness, and further is free of bubble inclusion.

11 Claims, No Drawings

POLYMERIZABLE COMPOSITION AND FORMED ARTICLE USING THE SAME

TECHNICAL FIELD

The invention relates to a polymerizable composition and a molded product manufactured by bulk polymerization thereof, and in particular, to a polymerizable composition excellent in fluidity and exhibiting a low viscosity even if a great amount of a filler is added thereinto, to a resin molded product obtained with the polymerizable composition, excellent in dielectric characteristics, heat resistance and adhesiveness, low in linear expansion coefficient and free of bubble inclusion, and to a crosslinked resin composite.

BACKGROUND ART

It has been known that a polymer obtained by bulk polymerization of a cycloolefin monomer in the presence of a metathesis polymerization catalyst is low in dielectric constant, dielectric loss tangent and water-absorbing ratio and excellent in mechanical strengths and heat resistance. Therefore, a cycloolefin bulk polymer with these features has been employed in various kinds of fields such as structural materials, optical parts, automobile parts, packaging materials and the like, and extremely preferably used as materials of electric or electronic parts.

In recent years, development has been requested of a multilayered high density substrate in which various kinds of elements such as a magnetic part, a capacitor and a semiconductor device are built in a circuit substrate. For the multilayered high density substrate which is able to build in a capacitor, used is a multilayer structure including a high dielectric constant layer. In order to achieve a circuit substrate for higher-speed use, a high frequency current is used, and therefore it has been required to reduce a transmission loss in proportion to a dielectric loss tangent. In a circuit substrate where various kinds of parts are surface mounted or built in, linear expansion coefficient of a metal such as semiconductor parts and wiring, and of an organic material are widely different, therefore it causes a breakage of parts and a disconnection of wiring by a environmental changes. Hence, materials with a high dielectric constant and a low linear expansion coefficient have been required in addition to conventional demand characteristics such as a low dielectric loss tangent, a high heat resistance and a low water-absorbing ratio.

In order to achieve a high dielectric constant, a low linear expansion coefficient, a high rigidity and the like, various methods have been proposed, a typical one of which is to mix a filler and a fiber reinforcement into a cycloolefin monomer. Japanese Patent Nos. 2755642, and 2859300, and Japanese Patent Application Laid-Open (JP-A) No. 9-183833 disclose that, by using a specific silane coupling agent, it is possible to reduce the viscosity of the composition when a filler is added, and to improve a rigidity of a bulk polymer obtained. However, when a large amount of the filler is mixed to satisfy the demand of a high dielectric constant and a low linear expansion coefficient, it causes a increase of viscosity of the polymerizable composition, and operability such as injection of the composition into a mold is worsened. Moreover, since bubbles generated in molding are included in a molded product (so called "bubble inclusion" occurs), a mechanical strength of the molded product is lowered or gets unevenness.

JP-A No. 2002-179889 discloses that when a monomer-soluble dispersant such as a silane coupling agent, a titanate coupling agent or a surfactant is employed, a low viscosity can be realized even if a large amount of a filler is mixed into a cycloolefin monomer. However, adding these filler has a problem to increase a dielectric loss tangent.

DISCLOSURE OF INVENTION

It is an object of the invention, which has been made in light of the problems in the conventional technology, to provide a polymerizable composition which is capable of providing a molded product with a high dielectric loss tangent, a low linear expansion coefficient and free of bubble inclusion, is obtained by mixing a filler into a cycloolefin monomer, and is low in viscosity and excellent in fluidity.

The present inventors have repeated extensive researches in order to solve the above problems so as to find out that the above-mentioned object can be attained by mixing a specific polymer having a carboxyl group or a carboxylic anhydride group into a cycloolefin monomer when a metathesis polymerization catalyst and a large amount of a filler is added. Based on such findings and knowledge, the invention has been completed.

According to the invention, the following first to eleventh aspects thereof will be provided.

1. A polymerizable composition comprising: a cycloolefin monomer (A), a filler (B), a polymer (C) having a carboxyl group or a carboxylic anhydride group and having an acid value in the range of 0.1 to 100 mgKOH/g, and a metathesis polymerization catalyst (D).
2. The polymerizable composition according to above 1, further comprising a chain transfer agent.
3. The polymerizable composition according to above 1, further comprising a crosslinking agent.
4. The polymerizable composition according to above 1, further comprising a chain transfer agent and a crosslinking agent.
5. A molded product obtained by bulk polymerization of the polymerizable composition as in above 1 to 4.
6. The molded product according to above 5, obtained by coating the polymerizable composition on a supporting body, followed by bulk polymerization.
7. The molded product according to above 5, obtained by injecting the polymerizable composition into a cavity of a forming mold, followed by bulk polymerization.
8. The molded product according to above 5, obtained by impregnating a fiber reinforcement with the polymerization composition, followed by bulk polymerization.
9. A crosslinked resin molded product obtained by bulk polymerization of the polymerizable composition as in above 3, followed by crosslinking of the bulk polymer.
10. A crosslinked resin molded product obtained by heating and melting a molded product obtained by bulk polymerization of the polymerizable composition as in above 4 so as to be crosslinked, at the temperature higher than the peak temperature during the bulk polymerization.
11. A crosslinked resin composite obtained by laminating a molded product obtained by bulk polymerization of the polymerizable composition as in above 4 on a base material, followed by heating and melting the laminate.

BEST MODE FOR CARRYING OUT THE INVENTION

A polymerizable composition of the invention contains: a cycloolefin monomer (A), a filler (B), a polymer (C) having a carboxyl group or a carboxylic anhydride group and having an acid value in a specific range, and a metathesis polymerization catalyst (D).

The cycloolefin monomer (A) is a cyclic hydrocarbon compound having a carbon-carbon double bond in the ring. Examples of the cycloolefin monomer (A) include a norbornene-type cycloolefin monomer and a mono cycloolefin monomer.

The norbornene-type cycloolefin monomer is a compound having a norbornene ring. Examples of the norbornene-type cycloolefin monomer include: norbornenes; dicyclopentadienes; tetracyclododecenes; cycloolefins each having 5 or more rings in molecule and the like. The norbornene-type cycloolefin may have hydrocarbon groups such as an alkyl group, an alkenyl group, an alkylidene group and an aryl group; and polar groups such as a carboxyl group. Besides, the norbornene-type cycloolefin monomer may have another double bond in addition to the double bond in the norbornene ring.

Specific examples of norbornenes include: bicyclo[2.2.1]hept-2-ene (hereinafter referred to as 2-norbornene), 5-ethyliden-2-norbornene, 5-vinyl-2-norbornene, 5-phenyl-2-norbornene, tetracyclo[9.2.1.0$^{2,1}$.0.0$^{3,8}$]tetradc-3,5,7,12-tetraene (also referred to as 1,4-methano-1,4,4a,9a-tetrahydro-9H-fluorene), acrylic acid 5-norbornen-2-yl, methacrylic acid 5-norbornen-2-yl, 5-norobonen-2-carboxylic acid, 5-norbornen-2,3-dicarboxylic acid, 5-norbornen-2,3-dicarboxylic anhydride, 7-oxa-2-norbornene, 5-ethylidene-7-oxa-2-norbornene and the like.

Specific examples of dicyclopentadienes include: dicyclopentadiene, methyldicyclopentadiene, dihydrodicyclopentadiene (tricyclo[5.2.1.0$^{2,6}$]dec-8-ene) and the like.

Specific examples of tetracyclododecenes include: tetracyclo[6.2.1.1$^{3,6}$.0$^{2,7}$]dodec-4-ene (hereinafter referred to as 4-tetracyclododecene), 9-ethylidenetetracyclo[6.2.1.1$^{3,6}$.0$^{2,7}$]dodec-4-ene, 9-vinyltetracyclo[6.2.1.1$^{3,6}$.0$^{2,7}$]dodec-4-ene, 9-phenyltetracyclo[6.2.1.1$^{3,6}$.0$^{2,7}$]dodec-4-ene, tetracyclo[6.2.1.1$^{3,6}$.0$^{2,7}$]dodec-9-ene-4-carboxylic acid, tetracyclo[6.2.1.1$^{3,6}$.0$^{2,7}$]dodec-9-ene-4,5-dicarboxylic anhydride and the like.

Specific examples of cycloolefins each having 5 or more rings in molecule include: pentacyclo[6.5.1.1$^{3,6}$.0$^{2,7}$.0$^{9,13}$]pentadec-4,10-diene, pentacyclo[9.2.1.1$^{4,7}$.0$^{2,7}$.0$^{2,10}$.0$^{3,8}$]pentadec-5,12-diene and the like.

The norbornene monomer can be used either alone or two or more kinds in combination. By using two or more kinds of monomers together and varying the ratio thereof, it is possible to adjust the glass transition temperature and the melting point of the molded product.

The monocycloolefin monomer is a compound having one aliphatic ring. Examples of the mono cycloolefin monomer include: cyclobutene, cyclopentene, cyclooctene, cyclododecene, 1,5-cyclooctadiene, and derivatives thereof each having a functional group.

When the monocycloolefin monomer is used as the cycloolefin monomer (A), the ratio of the mono cycloolefin monomer is preferably 40 wt % or less and more preferably 20 wt % or less relative to the total amount of monomers and, in this case, it is preferable to use the norbornene monomer as the other monomer. If the ratio of the mono cycloolefin monomer is high, the hardness of the molded product tends to be lower.

Since the filler (B) is mixed in the polymerizable composition, the molded product or the composite that is obtained by bulk polymerization of the polymerizable composition of the invention has effects on reduction in linear expansion coefficient, improvement in mechanical strengths such as elastic modulus, increase in dielectric constant, decrease in dielectric loss tangent, decrease in the degree of shrinkage on curing and the like.

The filler (B) is preferably in a particulate form. The average particle diameter is the average value calculated from measuring the lengths of the major axes of 1000 filler particles under a scanning electron microscope. The average particle diameter of the filler (B) in a granulated form is preferably in the range of 0.001 to 100 μm, more preferably 0.01 to 50 μm, still more preferably 0.1 to 20 μm.

The filler (B) may be an inorganic filler or an organic filler. The inorganic filler is preferable in order to achieve the above object. Examples of the inorganic filler include hydroxides such as aluminum hydroxide, magnesium hydroxide, sodium hydroxide, calcium hydroxide, ferrous hydroxide, ferric hydroxide, cuprous hydroxide, cupric hydroxide, stannous hydroxide, and stannic hydroxide; oxides such as silicon oxide (silica), aluminum oxide, zirconium oxide, zinc oxide, magnesium oxide, titanium oxide, sodium oxide, calcium oxide, ferrous oxide, ferric oxide, cuprous oxide, cupric oxide, tin oxide, cordierite (2MgO.2Al$_2$O$_3$.5SiO$_2$), and antimony oxide; chlorides such as sodium chloride, sodium bromide, calcium chloride, aluminum chloride, ferrous chloride, ferric chloride, cuprous chloride, cupric chloride, stannous chloride, stannic chloride, chlorosilane, ammonium chloride, and antimony trichloride; sulfates such as sodium hydrogen sulfate, sodium sulfate, calcium sulfate, and ammonium sulfate; nitrates such as sodium nitrate and calcium nitrate; phosphates such as sodium dihydrogen phosphate, sodium hydrogen phosphate, sodium phosphate, ammonium phosphate, and sodium polyphosphate; silicates such as montmorillonite, mica, kaolin, fly ash, and hydrous magnesium silicate (talc); antimonates such as sodium antimonate; titanates such as barium titanate, calcium titanate, and strontium titanate; carbonates such as sodium hydrogencarbonate, sodium carbonate, and calcium carbonate; sulfites such as sodium hydrogen sulfite and sodium sulfite; hypophosphites such as sodium hypophosphite and ammonium hypophosphite; phosphites such as sodium phosphite; hypohalites such as sodium hypochlorite, calcium hypochlorite, and sodium hypobromite; thiosulfites such as sodium thiosulfite; thiosulfates such as sodium thiosulfate; halates such as sodium chlorate, calcium chlorate, and sodium bromate; halites such as sodium chlorite, calcium chlorite, and sodium bromite; perhalates such as sodium perchlorate, calcium perchlorate, and sodium perbromate; carbides such as silicon carbide and boron carbide; nitrides such as aluminum nitride, boron nitride, and silicon nitride; glass powder; carbon black; or the like.

Other examples of the inorganic filler include metal particles such as aluminum, nickel, magnesium, copper, zinc and iron; ferrites such as Mn—Mg—Zn ferrite, Ni—Zn ferrite and Mn—Zn ferrite; and powder of ferromagnetic metals such as carbonyl iron, iron-silicon alloy, iron-aluminum-silicon alloy and iron-nickel alloy.

Among the above fillers, preferable are hydroxides, oxides, titanates and carbonates, and more preferable are aluminum hydroxide and magnesium hydroxide among the hydroxides, silicon oxide (silica) among the oxides, barium titanate and calcium titanate among the titanates and calcium carbonate among the carbonates.

These fillers can also be used in the surface treated forms thereof and the surface treating agents used for the fillers include: a silane coupling agent, a titanate coupling agent, an aluminum coupling agent and the like.

The amount of the filler (B) incorporated is usually in the range of 1 to 2,000 parts by weight, preferably 100 to 1,500 parts by weight, more preferably 200 to 1,000 and still more preferably 300 to 700 parts by weight relative to 100 parts by weight of the cycloolefin monomer (A). When the amount of the filler (B) is too low, high dielectric constant and low linear expansion coefficient are not sufficiently obtained, while when the amount of the filler (B) is too high, mechanical strength may lower.

The polymer (C) used in the invention, having a carboxyl group or a carboxylic anhydride group and having an acid value in the range of 0.1 to 100 mgKOH/g (hereinafter referred to simply as "polymer (C)") has no specific limitation on a structure thereof. From the viewpoint of compatibility with the cycloolefin monomer (A), the polymer (C) has preferably a ring structure, more preferably an alicyclic structure. The number of carbon atoms constituting the ring structure is not particularly limited, but is usually 4 to 30, preferably 5 to 20, more preferably 5 to 15. The ratio of the monomer unit having the ring structure in the polymer is usually 30 wt % or more, preferably 50 wt % or more and more preferably 70 wt % or more. When the ratio is too low, dielectric loss tangent and water-absorbing ratio of the molded product may be higher, and heat resistance thereof may lower.

Examples of the polymer (c) include a homopolymer of a monomer having a carboxyl group or a carboxylic anhydride group; a copolymer of the above monomer and another monomer copolymerizable with the above monomer; and a post-modified polymer obtained in a procedure in which a base polymer having neither a carboxyl group nor a carboxylic anhydride group is graft-modified according to an ordinary method with a compound having a carboxyl group or a carboxylic anhydride group such as acrylic acid, maleic acid or maleic anhydride. Among them, preferable as the polymer (C) is the post-modified polymer because of excellence in physical properties such as viscosity of the polymerizable composition, heat resistance and dielectric characteristic of the molded product to be obtained.

The polymerization method of the base polymer includes radical polymerization, cationic polymerization, anionic polymerization, metathesis polymerization, thermal polymerization and the like.

Examples of the monomer used in producing the base polymer include: conjugated dienes such as butadiene, 1,3-pentadiene and isoprene; cycloolefin monomers including monocycloolefin monomers same as exemplified as the cycloolefin monomer such as cyclopentene and cyclohexane, and norbornene-type cycloolefin monomers such as 2-norbornene, dicyclopentadiene, 5-methyl-2-norbornene, 4-tetracyclododecene and 9-propenyl-4-tetracyclododecene; norbornene acrylates and methacrylates; vinyl group-containing compounds such as methyl acrylate, methyl methacrylate, 2-hydroxyethyl acrylate, 2-hydroxyethyl methacrylate, acrylonitrile, vinyl acetate and vinyl alcohol. From the viewpoint of compatibility with the cycloolefin monomer, decrease in dielectric loss tangent and decrease in water-absorbing ratio of the molded product to be obtained, the cycloolefin monomer is preferable, and the norbornene-type cycloolefin monomer is more preferable. The ratio of the cycloolefin monomer in the total monomers is usually 5 wt % or more, preferably 10 wt % or more, more preferably 15 wt % or more, most preferably 20 wt % or more. Besides, more preferably is cationic polymerization in the combination of the monomer having 5 carbon atoms (C5) such as 1,3-pentadiene or cyclopentene and the other cycloolefin monomer. In this case, the ring structure can be formed during cationic polymerization.

The amount of the carboxyl group or the carboxylic anhydride group contained in the polymer (C) is, in terms of the acid value (unit:mgKOH/g) measured at room temperature using a 0.5 N potassium hydroxide, usually 0.1 to 100 mgKOH/g, preferably 1 to 75 mgKOH/g, more preferably 5 to 50 mgKOH/g, especially preferably 10 to 30 mgKOH/g.

When the polymer (C) has the amount of the carboxyl group or the carboxylic anhydride therein in the above range, it can be a good balance of characteristics such as viscosity of the polymerizable composition, and dielectric constant, dielectric loss tangent, water-absorbing ratio, heat resistance, mechanical strengths and adhesiveness of the molded product.

The number-average molecular weight of the polymer (C) is usually in the range of 200 to 50,000, preferably 200 to 10,000, more preferably 300 to 5,000 and still more preferably 500 to 2,000. When the number-average molecular weight thereof is too small, mechanical strengths and heat resistance of the molded product may be insufficient. On the other hand, if the number-average molecular weight thereof is too large, viscosity of the polymerizable composition may be higher.

With the polymer (C) included, the filler in the polymerizable composition of the invention is prevented from aggregation or precipitation thereof even if a large amount of the filler is dispersed in the cycloolefin monomer (equal to or more than the amount of the cycloolefin monomer) and the molded product obtained is high in dielectric constant, low in dielectric loss tangent, low in linear expansion coefficient, high in heat resistance, and in addition, excellent in mechanical strengths and adhesiveness.

Specific examples of the polymer (C) include: a polymer obtained by a maleic acid-modification of a resin obtained by cationic polymerization of a compound with C5 such as 1,3-pentadiene, isoprene and cyclopentene; a styrene-maleic anhydride copolymer, a norbornene-maleic anhydride copolymer; a ring-opening polymer and an addition polymer of norbornenes having a carboxylic acid, and hydrogenated products thereof. Among them, preferable is the polymer obtained by the maleic acid-modification of the resin obtained by cationic polymerization of the compound with C5 such as 1,3-pentadiene, isoprene and cyclopentene.

The amount of the polymer (C) added is usually in the range of 0.01 to 10 parts by weight, preferably 0.05 to 10 parts by weight and more preferably 0.1 to 5 parts by weight relative to 100 parts by weight of the filler (B).

When a titanate coupling agent or an aluminate coupling agent are used together with the polymer (C), viscosity of the polymerizable composition can preferably lower. The amount of the coupling agent added is usually in the range of 0.01 to 10 parts by weight, preferably 0.05 to 10 parts by weight, more preferably 0.1 to 5 parts by weight relative to 100 parts by weight of the filler (B).

The metathesis polymerization catalyst (D) contained in the polymerizable composition of the invention is not particularly limited insofar as it enables the ring-opening metathesis polymerization of the cycloolefin monomer. The metathesis polymerization catalyst includes a complex having a transition metal atom as a central atom to which a plurality of ions, atoms, multi-atom ions and/or compounds are bonded.

The transition metal atoms include: atoms of groups 5, 6 and 8 of a periodic table (long periodic-type, which also applies in later description). The atom in respective groups is not particularly limited, and the examples thereof are tantalum in Group 5, molybdenum or tungsten in Group 6 and ruthenium or osmium in Group 8.

Among them, preferable is the complex of ruthenium or osmium in group 8 to be used as the metathesis polymerization catalyst and more preferable is a ruthenium carbene complex. The ruthenium carbene complex allows high ring-opening polymerization reaction ratio of the polymerizable composition because of its excellency in catalytic activity, thereby exhibits excellent productivity.

Further, the molded product to be obtained is less smelly (originating from unreacted cycloolefin). The ruthenium carbene complex is relatively stable to oxygen and water in air and hardly inactivated.

The ruthenium carbene complex is preferably a compound represented by the following formula (1) or (2):

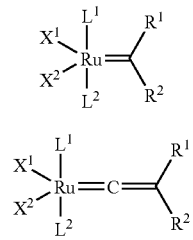

In the formulae (1) and (2), $R^1$ and $R^2$ may be the same or different, and each represents a hydrogen atom, a halogen atom, or a hydrocarbon group having 1 to 20 carbon atoms optionally containing a halogen atom, an oxygen atom, a nitrogen atom, a sulfur atom, a phosphorus atom or a silicon atom. $X^1$ and $X^2$ may be the same or different, and each represents an arbitrary anionic ligand.

$L^1$ and $L^2$ may be the same or different, and each represents a heteroatom-containing carbene compound or a neutral electron-donating compound, and at least one of $L^1$ and $L^2$ is a heteroatom-containing carbene compound. The heteroatom-containing carbene compound is preferable because it has high temperature dependence of the polymerization reaction conversion and gives the molded product excellent in storage stability at low temperatures and in polymerization reactivity at high temperatures.

$R^1, R^2, X^1, X^2, L^1$ and $L^2$ may be bonded to one another in an arbitrary combination to form a multidentate chelate ligand.

The heteroatom means an atom in groups 15 or 16 of the periodic table, examples of heteroatom include a nitrogen atom, an oxygen atom, a phosphorus atom, a sulfur atom, an arsenic atom and a selenium atom. Among them, preferable are a nitrogen atom, an oxygen atom, a phosphorus atom and a sulfur atom, and more preferable is a nitrogen atom from the viewpoint of obtaining the stable carbene compound.

The heteroatom-containing carbene compound preferably has heteroatoms bonded to, and adjacent to, both sides of a carbene atom, and more preferably has a heterocycle constituted by containing a carbene carbon atom and heteroatoms in both sides of the carbene carbon atom. Preferably, the heteroatoms adjacent to the carbene carbon atom have a bulky substituent group such as a 2,4,6-trimethylphenyl group bonded thereto.

Examples of the heteroatom-containing carbene compound include compounds represented by the following formulae (3) or (4):

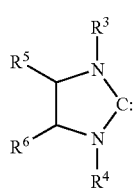

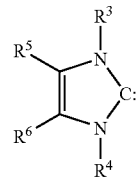

wherein $R^3$ to $R^6$ may be the same or different, and each represent a hydrogen atom, a halogen atom, or a hydrocarbon group having 1 to 20 carbon atoms optionally containing a halogen atom, an oxygen atom, a nitrogen atom, a sulfur atom, a phosphorus atom or a silicon atom, and $R^3$ to $R^4$ may be bonded to each other in an arbitrary combination to form a ring.

Specific examples of the compounds represented by the formulae (3) and (4) above include 1,3-dimesitylimidazolidin-2-ylidene, 1,3-dimesityl-4-imidazolin-2-ylidene, 1,3-di (1-phenylethyl)-4-imidazolin-2-ylidene, and 1,3-dimethyl-2,3-dihydrobenzimidazol-2-ylidene.

In addition to the compounds represented by the formulae (3) and (4) above, it is also possible to employ, as the heteroatom-containing carbene compound, 1,3,4-triphenyl-2,3,4,5-tetrahydro-1H-1,2,4-triazol-5-ylidene and 1,3,4-triphenyl-4,5-dihydro-1H-1,2,4-triazol-5-ylidene and the like.

In the formulae (1) and (2), each of the anionic (negative ionic) ligands $X^1$ and $X^2$ is a ligand to be negatively charged upon removal from the central metal, and examples thereof include halogen atoms such as a fluorine atom, a chlorine atom, a bromine atom and iodine atom; a diketonate group, a substituted cyclopentadienyl group, an alkoxyl group, an aryloxy group and a carboxyl group. Among these groups, a halogen atom is preferable, and a chlorine atom is more preferable.

The neutral electron-donating compound of $L^1$ and $L^2$ in the formulae (1) and (2) is a legend to have neutral charge upon removal from the central metal, that is, any Lewis base is employed. Specific examples thereof include carbonyls, amines, pyridines, ethers, nitrites, esters, phosphines, thioethers, aromatic compounds, olefins, isocyanides, and thiocyanates. Among these compounds, phosphines, ethers and pyridines are preferable, and trialkyl phosphine is more preferable.

The complex compound represented by the formula (1) above includes, for example, ruthenium complex compounds having a heteroatom-containing carbene compound and a neutral electron-donating compound, such as benzylidene (1,3-dimesithylimidazolidin-2-ylidene)(tricyclohexyl phosphine) ruthenium dichloride, (1,3-dimesithylimidazolidin-2-ylidene) (3-methyl-2-buten-1-ylidene)(tricyclopentyl phosphine) ruthenium dichloride, benzylidene (1,3-dimesithyl-octahydrobenzimidazol-2-ylidene)(tricyclohexyl phosphine) ruthenium dichloride, benzylidene (1,3-di(1-phenylethyl)-4-imidazolin-2-ylidene)(tricyclohexyl phosphine) ruthenium dichloride, benzylidene (1,3-dimesithyl-2,3-dihydrobenzimidazol-2-ylidene)(tricyclohexyl phosphine) ruthenium dichloride, benzylidene (tricyclohexyl phosphine) (1,3,4-triphenyl-2,3,4,5-tetrahydro-1H-1,2,4-triazol-5-ylidene) ruthenium dichloride, (1,3-diisopropylhexahydropyrimidin-2-ylidene) (ethoxymethylene)(tricyclohexyl phosphine) ruthenium dichloride, and benzylidene (1,3-dimesitylimidazolidin-2-ylidene)pyridine ruthenium dichloride; and ruthenium complex compounds having two heteroatom-containing, such as benzylidenebis(1,3-dicyclohexylimidazolidin-2-ylidene) ruthenium dichloride and benzylidenebis(1,3-diisopropyl-4-imidazolin-2-ylidene) ruthenium dichloride.

The complex compound represented by the formula (2) above includes, for example, (1,3-dimesitylimidazolidin-2-ylidene) (phenylvinylidene) (tricyclohexyl phosphine) ruthenium dichloride, (t-butylvinylidene) (1,3-diisopropyl-4-imidazolin-2-ylidene) (tricyclopentyl phosphine) ruthenium dichloride, and bis(1,3-dicyclohexyl-4-imidazolin-2-ylidene)phenyl vinylidene ruthenium dichloride.

These ruthenium complex compounds can be produced by methods described in, for example, Organic Letters, vol. 1, p. 953 (1999) and Tetrahedron Letters, vol. 40, p. 2247 (1999).

The amount of the ruthenium catalyst, in terms of the molar ratio of (ruthenium atom in the catalyst cycloolefin monomer), is usually in the range of 1:2,000 to 1:2,000,000, preferably 1:5,000 to 1:1,000,000, more preferably 1:10,000 to 1:500,000.

The ruthenium catalyst can be used if necessary in the form of a solution in a small amount of an inert solvent. The solvent includes, for example, acyclic aliphatic hydrocarbons such as n-pentane, n-hexane and n-heptane; alicyclic hydrocarbons such as cyclopentane, cyclohexane, methyl cyclohexane, dimethyl cyclohexane, hexahydroindene and cyclooctane; aromatic hydrocarbons such as benzene, toluene and xylene; nitrogen-containing hydrocarbons such as nitromethane, nitrobenzene and acetonitrile; and oxygen-containing hydrocarbons such as diethyl ether and tetrahydrofuran. Preferable among these solvents are industrially widely usable aromatic hydrocarbons, acyclic aliphatic hydrocarbons and alicyclic hydrocarbons in which the ruthenium catalyst is excellent insolubility. Further, a liquid antioxidant, a liquid plasticizer and a liquid elastomer may be used as the inert solvent insofar as it does not lower the catalytic activity of the ruthenium catalyst.

For the purpose of regulating the polymerization activity of the metathesis polymerization catalyst (D) or improving the conversion of polymerization reaction, an activator (cocatalyst) or a retarder can be mixed into the polymerizable composition of the invention. The activator can be exemplified by (partial) alkylation products, (partial) halogenation products, (partial) alkoxylation products and (partial) aryloxylation products of aluminum, scandium, tin, titanium, and zirconium.

Specific examples of the activator include trialkoxy aluminum, triphenoxy aluminum, dialkoxyalkyl aluminum, alkoxydialkyl aluminum, trialkyl aluminum, dialkoxy aluminum chloride, alkoxyalkyl aluminum chloride, dialkyl aluminum chloride, trialkoxyscandium, tetraalkoxytitanium, tetraalkoxy tin, and tetraalkoxy zirconium.

Examples of the retarder include: acyclic diene compounds such as 1,5-hexadiene, 2,5-dimethyl-1,5-hexadiene, (cis,cis)-2,6-octadiene, (cis,trans)-2,6-octadiene, and (trans,trans)-2,6-octadiene; acyclic triene compounds such as (trans)-1,3,5-hexatriene, (cis)-1,3,5-hexatriene, (trans)-2,5-dimethyl-1,3,5-hexatriene, and (cis)-2,5-dimethyl-1,3,5-hexatriene; phosphines such as triphenylphosphine, tri-n-butylphosphine and methyldiphenylphosphine; and Lewis bases such as aniline.

Cycloolefins having a diene structure or a triene structure can be used as the retarder. Examples of the cycloolefin include: monocycloolefins such as 1,5-cyclooctadiene, 1,5-dimethyl-1,5-cyclooctadiene, 1,3,5-cycloheptatriene and (cis,trans,trans)-1,5,9-cyclododecatriene; and polycyclic compounds such as 5-vinyl-2-norbornene, 5-isopropenyl-2-norbornene and 5-(1-propenyl)-2-norbornene.

Since the cycloolefin having a diene structure or a triene structure is a retarder and at the same time a cycloolefin monomer (A), the cycloolefin can be used as part of the cycloolefin monomer (A) at the same time can also functions as the retarder.

The amount of the activator or the retarder used can be arbitrarily set depending on the used compound and the object, and usually in the range of 1:0.05 to 1:100, preferably 1:0.2 to 1:20 and more preferably 1:0.5 to 1:10, in terms of (metal atom in the ruthenium catalyst the activator or the retarder).

The activator and the retarder is preferably used by dissolving into the cycloolefin monomer (A), but can be used as a suspension or a solution in a small amount of solvent unless the properties of the objective molded product are essentially deteriorated.

Various kinds of additives can be mixed into the polymerizable composition of the invention when required in the range where the additive does not degrade the effect of the invention. Examples of the additive include a chain transfer agent, a crosslinking agent, a modifier, an antioxidant, a flame retardant, a colorant, a light stabilizer and the like.

When the molded product made of a thermoplastic resin (thermoplastic resin molded product) with high fluidity is desired to be acquired as the molded product obtained by bulk polymerization of the polymerizable composition of the invention, it is preferable to mix a chain transfer agent into the polymerizable composition.

A compound having a carbon-carbon double bond can be used as the chain transfer agent. Specific examples thereof include vinyl norbornenes such as 2-vinyl norbornene; aliphatic olefins such as 1-hexene, 2-hexene or the like; aromatic olefins such as styrene, vinyl styrene, stilbene or the like; vinyl alicyclic compounds such as vinyl cyclohexane, vinyl cyclohexene or the like; vinyl ethers such as ethyl vinyl ether, allyl glycidyl ether or the like; vinyl ketones such as methyl vinyl ketone or the like; ethylenically unsaturated alcohol esters of carboxylic acid compound such as allyl acetate, allyl methacrylate or the like; alcoxy silanes such as vinyl trimethoxy silane, allyl trimethoxy silane, p-styryl trimethoxy silane or the like. Among them, especially preferable is ethylenically unsaturated alcohol esters of carboxylic acid compound. The amount of the chain transfer agent used is usually 0.01 to 10 wt %, preferably 0.05 to 5 wt %, more preferably 0.1 to 2 wt %, relative to the cycloolefin monomer (A). When the amount of the chain transfer agent used is in this range, the thermoplastic resin molded product excellent in fluidity can be obtained.

The crosslinking agent can be mixed into the polymerizable composition when the crosslinked resin molded product of the invention is obtained.

The kind of the crosslinking agent can be set according to which site of the thermoplastic resin is crosslinked. For example, when crosslinking is intended to occur at a carbon-carbon double bond or a saturated bond part, a radical generating agent can be used. When a carboxylic group or an acid anhydride group is used as a crosslinking point, an epoxy compound can be used. When a hydroxyl group is used as a crosslinking point, a compound containing an isocyanate group can be used. Moreover, a Lewis acid can be used as the crosslinking agent to conduct cationic crosslinking. Among the crosslinking agents, preferable are the radical generating agent and the compound containing an isocyanate group (isocyanate group-containing compound), more preferable are using the radical generating agent and the isocyanate group-containing compound together, and especially preferable is using the radical generating agent.

Examples of the radical generating agent include an organic peroxide and a diazo compound. Examples of the organic peroxide include: dialkyl peroxides such as dicumyl peroxide, t-butyl cumyl peroxide and di-t-butyl peroxide; hydroperoxides such as t-butyl hydroperoxide, p-menthane hydroperoxide, cumene hydroperoxide; diacyl peroxides such as dipropionyl peroxide and benzoyl peroxide; peroxyesters such as t-butyl peroxy acetate and t-butyl peroxy benzoate; peroxycarbonates such as t-butyl peroxy isopropyl carbonate and di(isopropylperoxy) dicarbonate; and alkylsilyl peroxide such as t-butyl trimethylsilyl peroxide. Among them, preferably is dialkyl peroxide since the hindrance against the metathesis polymerization reaction is lower.

Examples of the diazo compounds include: 4,4'-bisazidebenzal(4-methyl)cyclohexanone, 4,4'-diazidochalcone, 2,6-bis(4'-azidobenzal)cyclohexanone, 2,6-bis(4'-azidobenzal)-4-methylcyclohexanone, 4,4'-diazidodiphenylsulfon, 4,4'-diazidodiphenylmethane and 2,2'-diazidostilbene.

Examples of the isocyanate group-containing compound include: a compound having two or more isocyanate groups in the molecule such as p-phenylene diisocyanate, 2,6-toluene diisocyanate and hexamethylene diisocyanate.

Examples of the Lewis acid include silicon tetrachloride, hydrochloric acid, sulfuric acid, ferric chloride, aluminum chloride, stannic chloride, titanium tetrachloride and the like.

The amount of the crosslinking agent mixed can be set properly according to the kind of the crosslinking agent to be used. For example, when the radical generating agent is used as the crosslinking agent, the amount of the crosslinking agent used is usually in the range of 0.1 to 10 parts by weight and preferably 0.5 to 5 parts by weight relative to 100 parts by weight of the cycloolefin monomer (A). When the amount thereof is too low, crosslinking may be insufficient and the crosslinked molded product with a high crosslinking density may not be obtained. To the contrary, when the amount thereof is too high, the crosslinking effect is saturated and the bulk polymer with high physical properties better-than-expected may not be obtained.

For the purpose of improving the crosslinking speed, a crosslinking assistant in addition to the above crosslinking agent can be added. Examples of the crosslinking assistant include: dioxime compounds such as p-quinone dioxime; methacrylate compounds such as a lauryl methacrylate and trimethylolpropane trimethacrylate; fumaric acid compounds such as diallyl fumarate; phthalic acid compounds such as diallyl phthalate; cyanuric acid compounds such as triallyl cyanurate; and imide compounds such as maleimide. The amount of the crosslinking assistant used is not particularly limited, but is usually in the range of 0 to 100 parts by weight and preferably 0 to 50 parts by weight relative to 100 parts by weight of the cycloolefin monomer (A).

Examples of the modifier include: elastomers such as natural rubber, polybutadiene, polyisoprene, styrene-butadiene copolymer, styrene-butadiene-stryrene block copolymer, styrene-isoprene-styrene copolymer, acrylonitrile-butadiene-styrene copolymer, acrylonitrile-butadiene copolymer, ethylene-propylene-diene terpolymer, ethylene-vinyl acetate copolymer, polysufide synthetic rubber, acrylic rubber, urethane rubber, fluoro-rubber, silicone rubber, polyester elastomer, polyolefin thermoplastic elastomer and polyvinyl chloride thermoplastic elastomer.

Example of the antioxidant include: various kinds of antioxidants for plastics and rubbers such as a phenol-based antioxidant, a phosphorus-based antioxidant and an amine-based antioxidant. The antioxidant may be used either alone or in combination of two or more kinds.

Preparation of the polymerizable composition of the invention is conducted by mixing the cycloolefin monomer (A), the filler (B), the polymer (C) having a carboxyl group or a carboxylic anhydride group, and an acid value of which is in the specific range, the metathesis polymerization catalyst (D) and the arbitrary additives when required. An apparatus for mixing is not particularly limited.

The molded product of the invention can be obtained by bulk polymerization of the polymerizable composition of the invention. The method for obtaining the molded product by bulk polymerization of the polymerizable composition of the invention is not particularly limited, but there are, for example, a method for bulk polymerizing by using a supporting body and a method for bulk polymerizing in a metal mold, and these method enable the molded product to be obtained at the same time as polymerization. To be concrete, the following methods are exemplified, which are (a) a method of coating the polymerizable composition on a supporting body, followed by bulk polymerizatrion, (b) a method of injecting the polymerizable composition into a cavity in a forming mold, followed by bulk polymerization and (c) a method of impregnating fiber reinforcement with the polymerization composition, followed by bulk polymerization.

Since the polymerizable composition of the invention is extremely low in viscosity, coating in the method (a) can be smoothly performed, injection in the method (b) can be quickly performed throughout the cavity without bubble inclusion even if the cavity has a complicated shape, and in the method (c) the polymerizable composition can be impregnated into the fiber reinforcement quickly and uniformly.

According to the method (a), a molded product in the shape of a film, a sheet or a plate can be obtained. The thickness of the molded product is not particularly limited and set according to the application, but is usually 15 mm or less, preferably 10 mm or less and more preferably 5 mm or less.

Examples of the supporting body include: resins such as polyethylene terephthalate, polypropylene, polyethylene, polycarbonate, polyethylene naphthalate, polyallylate and Nylon; metal materials such as iron, stainless steel, copper, aluminum, nickel, chromium, gold and silver. Among them, preferable is a metal foil or a resin film. The thickness of the metal film or the resin film is usually in the range of 1 to 150 μm, preferably 2 to 100 μm, and more preferably 3 to 75 μm from the viewpoint of workability.

The methods for coating the polymerizable composition of the invention on the supporting body are not particularly limited, but there are known coating methods such as a spray coating method, a dip coating method, a roll coating method, a curtain coating method, a die coating method, a slit coating method.

The methods for heating the polymerizable composition coated on the supporting body at the predetermined temperature are not particularly limited, but there are a method for heating the supporting body placed on a heating plate, a method for heating under a pressure (heat pressing) using a press machine, a method for pressing by using a heated roller, and a method using a heating furnace.

The shape of the molded product obtained by the method (b) is not particularly limited can be arbitrarily set by the shape of the forming mold. Examples thereof include: a sheet, a film, a column, and any other three-dimensional shapes.

The shape, material and size of the forming mold are not particularly limited. As the forming mold, a conventional known mold can be used, for example, a split mold, that is, a mold having a core mold and a cavity mold; and a mold in which spacers are provided between two plates, with a spacing on both sides or one side.

The charging pressure (injection pressure) at which the cavity is charged with the polymerizable composition of the invention is usually 0.01 to 10 MPa, preferably 0.02 to 5 MPa. When the charging pressure is too low, a transfer face formed on the inner periphery of the cavity tends to be not excellently transferred, while when the charging pressure is too high, the rigidity of the mold should be higher, which is not economical. The clamping pressure is usually in the range of 0.01 to 10 MPa.

The method for heating the forming mold charged with the polymerizable composition includes: a method using heating means such as electrical heating or steam heating provided to the forming mold, a method heating the forming mold in a electric furnace and the like.

According to the method (c), a fiber reinforced molded product such as a prepreg reinforced with a fiber reinforcement can be obtained. As the fiber reinforcement, a fiber made of organic and/or inorganic material can be used and examples thereof include known fibers such as a glass fiber, a metal fiber, a ceramic fiber, a carbon fiber, an aramid fiber, a polyethylene terephthalate fiber, a vinylon fiber, a polyester fiber, and an amide fiber. These can be used either alone or in combination of two or more. Examples of shape of the fiber reinforcement include a mat, a cloth and a nonwoven fabric.

The method for impregnating the fiber reinforcement with the polymerizable composition includes, for example, a method in which a predetermined amount of the polymerizable composition is poured over the fiber reinforcement such as a cloth or a mat, a protective film is if necessary laminated on the wet coated fiber reinforcement, and pressing the wet coated fiber reinforcement using a roller from the upper side. After impregnating the fiber reinforcement with the polymerizable composition, the impregnated product is heated at a predetermined temperature to conduct bulk polymerization to obtain the fiber reinforced molded product in which the bulk polymer is impregnated. The method for heating the impregnated product includes, for example, a method in which the impregnated product is set on the supporting body and heating as done in the method (a); and a method in which the fiber reinforcement is set in the forming mold in advance, then impregnating the polymerizable composition therein, followed by heating as done in the method (b).

In any of the methods (a), (b) and (c), the heating temperature for polymerizing the polymerizable composition is usually in the range of 20 to 100° C. and preferably 20 to 80° C. The polymerization time may be properly set, and the time is usually in the range of from 10 seconds to 20 minutes and preferably within 5 minutes.

The bulk polymerization reaction is started by heating the polymerizable composition at a predetermined temperature. When the bulk polymerization reaction is started, the temperature of the reaction solution rapidly rises by heat generation and reaches a peak temperature in a short time (for example, 10 seconds to 5 minutes) to obtain the resin in which polymerization has been almost completely progressed. The resin in which polymerization has been almost completely progressed exhibits usually the polymerization reaction conversion of 80% or more, preferably 90% or more and more preferably 95% or more. The polymerization reaction conversion in the resin can be determined, for example, by analyzing a solution that is prepared by dissolving the resin in a solvent with a gas chromatography. The resin in which polymerization has been almost completely progressed is less in residual monomer and almost free of a smell originating from the residual monomer.

The crosslinked resin molded product of the invention is obtained by bulk polymerizing the polymerizable composition in which the crosslinking agent is mixed, and then crosslinking. When the chain transfer agent is mixed into the polymerizable composition in combination with the crosslinking agent, the resin molded product made of a post crosslinkable thermoplastic resin can be obtained, and the molded product is further heated and crosslinked to thereby become the crosslinked resin molded product.

When the crosslinking agent is contained in the polymerizable composition of the invention, it is possible to obtain the crosslinked resin molded product by setting a bulk polymerization temperature high and heating the composition to the temperature at which crosslinking reaction occurs. Besides, it is possible to obtain the crosslinked resin molded product by conducting only bulk polymerization at the temperature at which crosslinking reaction does not occur to thereby obtain the molded product made of a thermoplastic resin and thereafter, the molded product is heated to progress crosslinking to obtain the crosslinked resin molded product. In order to progress only polymerization reaction completely without progressing crosslinking reaction, it is required to control the peak temperature during bulk polymerization to be preferably lower than 200° C. If the resin molded product is obtained in such a way, no crosslinking reaction progresses during storage, therefore, the surface hardness of the thermoplastic molded product is hard to change, leading to excellency in storage stability.

When the radical generating agent is used as the crosslinking agent, the peak temperature during bulk polymerization is preferably equal to or lower than one minute half-life temperature of the radical generating agent. Herein, the term "one minute half-life temperature" means the temperature at which half of the original amount of the radical generating agent decomposes in one minute. For example, in a case of di-t-butyl peroxide, the temperature is 186° C. and in a case of 2,5-dimethyl-2,5-bis(t-butylperoxy)-3-hexine, the temperature is 194° C.

The resin molded product obtained by bulk polymerization of the polymerizable composition containing the crosslinking agent can be changed to harder crosslinked resin molded product of the invention when needed by progressing crosslinking reaction by heating and melting. The temperature for heating, melting and crosslinking the resin molded product is usually in the range of 150 to 250° C. and preferably 180 to 220° C. This temperature is preferably higher than the peak temperature during the bulk polymerization by 20° C. or more. The time for heating, melting and crosslinking the resin molded product is not particularly limited, but is usually in the range of several minutes to several hours.

The method for heating, melting and crosslinking the resin molded product of the invention is not particularly limited. When the resin molded product is in the shape of a sheet or a film, preferably adopted is a method in which plural resin molded products are if necessary laminated and the laminate is heated and melted by heat press. The pressure of heat press is usually in the range of 0.5 to 20 MPa and preferably 3 to 10 MPa.

The method for manufacturing the crosslinked resin composite of the invention is a method for laminating the resin molded product or the fiber reinforced molded product obtained by using the polymerizable composition of the invention containing a crosslinking agent and other base material, and heating, melting and crosslinking the resin molded product or the fiber reinforced molded product.

Examples of the other base material include: metal foils such as a copper foil, an aluminum foil, a nickel foil, a chromium foil, a gold foil and a silver foil; a substrate for printed wiring board substrate; and resin films such as a conductive polymer film. The surface of the metal foil may also treated with a silane coupling agent, a thiol coupling agent, a titanate coupling agent, various kinds of adhesives or the like. When the thermoplastic resin is produced with the method (a), the supporting body as is may be used as the other material.

The heating method used in the method for manufacturing the crosslinked resin composite of the invention is not particularly limited, and preferable is a method for laminating the resin molded product (preferably the resin molded product made of the thermoplastic resin) and other base material, heat pressing the laminate, which is preferable because of high productivity. Conditions for heat pressing are same as crosslinking.

Since the resin molded product of the invention get to the state of high fluidity when being heated and melted, the crosslinked resin composite such as a crosslinked resin metal foil covered laminate with the other base material adhered firmly can be obtained by laminating the resin molded product and the other base material such as the metal foil and thereafter, heating, melting and crosslinking the laminate.

The peel strength of the metal foil in the crosslinked resin metal foil covered laminate is not particularly limited. When the cupper foil is used as the metal foil, the peel strength is preferably 0.8 kN/m or more and more preferably 1.2 kN/m, which is measured based on JIS C 6481.

The polymerizable composition of the invention is low in viscosity and the resin molded product of the invention is excellent in dielectric characteristics (a high dielectric constant and a low dielectric loss tangent), a low linear expansion coefficient, mechanical strengths, heat resistance and the like. The crosslinked resin complex above is high in adhesion strength between the crosslinked resin of the invention and the other material.

The molded product obtained from the polymerizable composition of the invention having such features is preferably used as fiber reinforced molded products; resin laminated copper foils; and materials for electronic parts such as a printed wiring board, an insulation sheet, an interlayer insulation film, an overcoat and an antenna substrate. Since the polymerizable composition of the invention can also be used for the forming mold with a complicated shape, the polymerizable composition can be preferably used as parts of various transport instrument such as an automobile, an autobicycle and a boat; a bathtub; and cases for electric machine, electronic equipment and machines.

EXAMPLES

Hereinafter, the present invention is described in more detail by reference to the Examples and Comparative Examples. Hereinafter, "parts" and "%" are expressed on a weight basis unless otherwise specified. Testing and evaluation in the examples and the comparative examples are conducted in the following ways:

(1) Viscosity

Viscosity of a polymerizable composition was measured with an E type viscometer (type EHD, manufactured by TOKIMEC INC.) and a rotor No. 87, viscosity (V) in the condition that a temperature was at 25° C. and a rotation number of 1 rpm was measured, and results were evaluated with the following criteria.
◎: $V \leq 2.5$ Pa·S
○: $2.5$ Pa·S$<V \leq 5$ Pa·S
Δ: $5$ Pa·S$<V \leq 10$ Pa·S
X: $V>10$ Pa·S (2) Dielectric Constant Dielectric constant of a test piece in size of 20 mm×20 mm obtained by cutting off a flat plate-shaped crosslinked resin molded product was measured with a RF impedance/material analyzer E4991A (manufactured by Agilent Technologies Japan, Ltd.) at 1 GHz.

(3) Dielectric Loss Tangent

Dielectric loss tangent (T) at 1 GHz was measured in the same manner as dielectric constant and the results were evaluated with the following criteria.
◎: $T \leq 0.0005$
○: $0.005<T \leq 0.002$
Δ: $0.001<T \leq 0.002$
X: $T>0.002$ (4) Linear Expansion Coefficient Linear expansion coefficient (a) was measured by using a test piece in size of 20 mm×20 mm and with a thickness of 2 mm obtained by cutting off a flat plate-shaped crosslinked resin molded product, with a thermomechanical analyzer (TMA, manufactured by SEIKO CORPORATION, shrinkage mode) from 30° C. to 130° C., and results were evaluated with the following criteria.
◎: $\alpha<30$ ppm/° C.
○: $30$ ppm/° C.$\leq \alpha<35$ ppm/° C.
Δ: $35$ ppm/° C.$\leq \alpha<40$ ppm/° C.
X: $\alpha \geq 40$ ppm/° C.

(5) Bubble Inclusion

After breaking a flat plate-shaped crosslinked resin molded product by a tensile tester, the cross-section surface thereof was observed with an electron microscope to confirm the presence or absence of a bubble, and results were evaluated with the following criteria.
○: no bubble
Δ: with a small number of bubbles
X: with bubbles (6) Heat Resistance A double sided copper clad laminate was used and solder dip resistance at 260° C. was evaluated according to JIS testing method C 6481, and results were evaluated with the following criteria:
○: no swell
Δ: slight swell
X: with a swell (7) Adherence A double sided copper clad laminate after the heat resistance test was used, a peel strength (P) of a copper foil according to the JIS testing method C 5012, and adhesiveness was evaluated with the following criteria.
◎: $P \geq 1.0$ kN/m
○: $0.7$ kN/m$\leq P<1.0$ kN/m
Δ: $0.4$ kN/m$\leq P<0.7$ kN/m
X: $P<0.4$ kN/m (8) Hydroxyl Value Put into a reaction vessel are 2 g of an alicyclic structure-containing polymer having a hydroxyl group and an acetylating reagent (obtained by dissolving 25 g of acetic anhydride into 475 ml of pyridine), an acetylation reaction was conducted for 1 hour at 100° C., thereafter 1 g of pure water was added to conduct a hydrolysis reaction of residual acetic anhydride at 100° C. for 10 minutes, and after cooling off, the reaction mixture was titrated with 0.5 N potassium hydroxide solution with a phenol phthalein as an indicator and the amount of the solution (ml) used was referred to as "A". In the same manner, the amount of the solution (ml) used when only the acetylation reagent was titrated was referred to as "B". A hydroxyl value was obtained by the following formula.

$$\text{Hydroxyl Value (mgKOH/g)} = 28.05 \times (A-B)/2$$

Synthesis Example 1

Production of Acid Anhydride-Containing Polymer

Put into a reaction vessel purged by nitrogen were 100 parts of cyclopentane as a solvent and 1.2 parts of aluminum trichloride as a polymeization catalyst, and the mixture was heated up to 50° C. Into the heated mixture, 100 parts of a mixed monomer consisting of 57 parts of 1,3-pentadiene, 28 parts of cyclopentene and 15 parts of isobutene was continuously dropwised over 60 minutes and thereafter, stirring the mixture for 10 minutes and then, methanol and aqueous ammonia were added to stop the reaction. Then, the reaction solution was filtered to remove a residual catalyst and then the solvent was removed to obtain a polymer having an alicyclic structure.

Then, put into a reaction vessel purged with nitrogen were 100 parts of the polymer obtained and 3 parts of maleic anhydride, and the mixture was heated up to 230° C. and was stirred in the melting state for 1 hour to obtain a maleic anhydride-modified alicyclic structure-containing polymer (an acid anhydride group-containing polymer) with an acid value of 19 mgKOH/g, a number-average molecular weight of 1250 (a polystyrene conversion value in tetrahydrofuran as a solvent) and a glass transition temperature of 55° C.

Synthesis Example 2

Production of Hydroxyl Group-Containing Polymer

Put into a reaction vessel purged by nitrogen were 70 parts of dicyclopentadinene and 30 parts of allyl alcohol, and the mixture was heated up to 260° C. to conduct a thermal polymerization reaction for 4 hours, thereafter the inside of the vessel was evacuated to a vacuum state at 280° C. to remove oligomers such as dicyclopentadiene and tricyclopentadiene to obtain an alicyclic structure-containing polymer (a hydroxyl group-containing polymer) with an hydroxyl value of 205 mgKOH/g, a number-average molecular weight of 380 (a polystyrene conversion value in tetrahydrofuran as a solvent) and a glass transition temperature of 48° C.

Example 1

Dissolved into 3.67 parts of toluene were 0.17 part of benzylidene(1,3-dimesitylimidazolidin-2-ylidene) (tricyclohexylphosphine) ruthenium dichloride and 0.26 part of triphenylphosphine to prepare a catalyst solution with a ruthenium concentration of 0.05 mol/l.

Then, added into a mixed monomer including 70 parts of 4-tetracyclododecene and 30 parts of 2-norbornene were 1.2 parts of allyl methacrylate as a chain transfer agent, 0.93 part of di-t-butyl peroxide (one minute half-life temperature of 186° C.) as a crosslinking agent, 500 parts of barium titanate (NPO-S, manufactured by FUJI TITANIUM INDUSTRY CO., LTD., an average particle diameter of 1 μm) as a filler, 2.5 parts of an acid anhydride group-containing polymer obtained in Synthetic Example 1, 2.5 pats of a titanate coupling agent (KR-TTS, manufactured by Ajinomoto Co., Inc.), 2 parts of a phenol antioxidant (a trade name IRGANOX 1330, manufactured by Chiba Speciality Chemicals) and 1 part of diphenyldimethoxysilane, and the mixture was stirred for 5 minutes with a planetary stirring machine. Then, after the mixed solution was cooled down to 10° C., 0.4 part of the toluene solution of the catalyst prepared above was added, and further stirring the mixed solution with the planetary stirring machine for 10 seconds to obtain a polymerizable composition. Then, a part of the polymerizable composition obtained was sampled for measurement of a viscosity, and the residual composition was quickly poured into a stainless mold heated at 140° C. with a volume of 200 mm×200 mm×2.2 mm. The injection time was about 3 seconds. The series of operations were conducted in a nitrogen atmosphere and the reaction in the mold was conducted for 3 minutes.

When a part of flat plate-shaped molded product obtained therefrom was immersed in toluene for one day, the molded product was fully dissolved except barium titanate as the filler.

The flat plate-shaped thermoplastic molded product was cut off into a piece with a size of 95 mm×95 mm and a thickness of 2.2 mm, then the sample was put into a mold with a shape of framed rectangle, a inner size of 100 mm×100 mm, and a thickness of 2 mm, and then heat pressed under the press pressure of 4.1 MPa at 200° C. for 15 minutes. Thereafter, the sample was cooled down while the press pressure was kept on, and the sample was taken off after the temperature thereof was at 100° C. or less to obtain a flat-shaped crosslinked resin molded product. When a part of the flat plate-shaped crosslinked resin molded product was immersed in toluene for one day, it was not dissolved at all, thus it was confirmed that the resin component in the flat plate-shaped crosslinked molded product was a crosslinked resin. The crosslinked resin molded product was tested or evaluated as to a dielectric constant, a dielectric loss tangent, a linear expansion coefficient and bubble inclusion, results of which were shown in Table 1.

Then, three sheets of a glass cloth cut off each in size of 200 mm in length×200 mm in width and having a thickness of 0.092 mm (trade name 2116/350/AS891AW, manufactured by ASAHI-SHWEBEL CO., LTD) were placed on a glass fiber reinforced PTFE resin film cut off each in size of 300 mm in length and 300 mm in width and having a thickness of 0.08 mm (product number 5310, manufactured by SAINT-GOBAIN KK), then about 15 parts of the polymerizable composition obtained above was poured over the glass cloths, and another glass fiber reinforced PTFE resin film was covered thereon, followed by roller pressing to be impregnated with the polymerizable composition. The Impregnation was good.

After above impregnation, the impregnated laminate was adhered onto an aluminum plate heated at 145° C. for 1 minute. Thereafter, two glass fiber reinforced PTFE resin films were both peeled off to obtain a prepreg which is the fiber reinforced molded product.

When a part of the prepreg obtained was immersed in toluene for one day, the prepreg was fully dissolved except barium titanate as the filler and the glass cloth, therefore it was confirmed that the resin component in the prepreg was a thermoplastic resin. Besides, In the same manner, a part of the prepreg was immersed in toluene to dissolve the thermoplastic resin in the prepreg, and analyzing the solution obtained with gel permeation chromatography, a polymerization reaction conversion was 97% from a ratio of a polymer component and a residual monomer component.

On the other hand, two drops of acetic acid are added into 60 g of a distilled water and 0.18 g of vinyl-tri(2-methoxyethoxy)silane (a trade name of A-172, manufactured by Nippon Unicar Company Limited), and stirring the mixed solution for 10 minutes for hydrolysis and dissolution to obtain a silane coupling agent solution. The silane coupling agent solution obtained was coated, by using an absorbent cotton, on a rough surface of an electrodeposited copper foil (a rough surface GTS treated product, manufactured by FURUKAWA CIRCUIT FOIL Co., Ltd.) with a thickness of 0.018 mm, and followed by drying in a nitrogen atmosphere at 130° C. for 1 hour.

Three sheets of above prepreg (each sheet was cut off in size of 87 mm in length×87 mm in width) were put into a mold with a shape of framed rectangle, a inner size of 90 mm×90 mm, and a thickness of 1 mm, and then the silane coupling agent treated copper foils (cut off in size of 115 mm×115 mm)

were adhered to both sides of the three prepreg sheets so as to be sandwiched therebetween with rough surfaces on the prepreg sides. Then, the laminate were heat pressed in conditions that a press pressure of 4.1 MPa, a temperature of 200° C. and a time of 15 minutes. Thereafter, the laminate was cooled down while the press pressure was kept on, and the sample was taken off after the temperature thereof was at 100° C. or less to obtain a double sided copper clad laminate, which was a crosslinked resin composite.

Heat resistance and adhesiveness were tested and evaluated on the double sided copper clad laminate, results of which are shown in Table 1.

Example 2

The polymerizable composition was prepared in the same manner as in Example 1 with the exception that calcium titanate (CT-GA, manufactured by KCM Corporation Co., Ltd. with an average particle diameter of 1 μm) was used instead of barium titanate, and the flat plate-shaped crosslinked resin molded product and the double sided copper clad laminate were manufactured. Impregnation of the polymerizable composition to glass cloths was good. The test and evaluation were conducted in the same manner as in Example 1 and results are shown in Table 1.

Example 3

The polymerizable composition was prepared in the same manner as in Example 1 with the exception that the titanate coupling agent was not used and the amount of the acid anhydride group-containing polymer obtained in Synthesis Example 1 was changed to 5 parts, and the flat plate-shaped crosslinked resin molded product and the double sided copper clad laminate were manufactured. Impregnation of the polymerizable composition to glass cloths was good. The test and evaluation were conducted in the same manner as in Example 1 and results are shown in Table 1.

Example 4

The polymerizable composition was prepared in the same manner as in Example 1 with the exception that the titanate coupling agent was not used, the amount of barium titanate was changed to 300 parts and the amount of the acid anhydride group-containing polymer obtained in Synthesis Example 1 was changed to 3 parts, and the flat plate-shaped crosslinked resin molded product and the double sided copper clad laminate were manufactured. Impregnation of the polymerizable composition to glass cloths was good. The test and evaluation were conducted in the same manner as in Example 1 and results are shown in Table 1.

Example 5

The polymerizable composition was prepared in the same manner as in Example 1 with the exception that the titanate coupling agent was not used, 300 parts of silica (SO-E2, manufactured by ADMATECHS CO., LTD, with an average particle diameter of 0.6 μm) was used instead of 500 parts of barium titanate, and the amount of the acid anhydride group-containing polymer obtained in Synthesis Example 1 was changed to 3 parts, and the flat plate-shaped crosslinked resin molded product and the double sided copper clad laminate were manufactured. Impregnation of the polymerizable composition to glass cloths was good. The test and evaluation were conducted in the same manner as in Example 1 and results are shown in Table 1.

Example 6

The polymerizable composition was prepared in the same manner as in Example 1 with the exception that the titanate coupling agent was not used, the amount of barium titanate was changed to 300 parts and 2.5 parts of the acid anhydride group-containing polymer obtained in Synthesis Example 1 was changed to 3 parts of a styrene-maleic anhydride copolymer (with an acid value of 55 mgKOH/g, a ratio of an aromatic ring-containing repetition unit was 85% by mole and a number-average molecular weight of 1100, manufactured by Sartomer Company), and the flat plate-shaped crosslinked resin molded product and the double sided copper clad laminate were manufactured. Impregnation of the polymerizable composition to glass cloths was good. The test and evaluation were conducted in the same manner as in Example 1 and results are shown in Table 1.

Comparative Example 1

The polymerizable composition was prepared in the same manner as in Example 1 with the exception that the acid anhydride group-containing polymer obtained in Synthesis Example 1 was not used and the amount of the titanate coupling agent was changed to 5 parts, and the flat plate-shaped crosslinked resin molded product and the double sided copper clad laminate were tried to be manufactured. The flat plate-shaped molded product, however, was not obtained because viscosity of the polimerizable composition was too high, and impregnation into glass cloths therewith was not achieved.

Comparative Example 2

The polymerizable composition was prepared in the same manner as in Example 1 with the exception that the acid anhydride group-containing polymer obtained in Synthesis Example 1 was not used, the amount of barium titanate was changed to 300 parts and the amount of the titanate coupling agent was changed to 3 parts, and the flat plate-shaped crosslinked resin molded product and the double sided copper clad laminate were manufactured. Impregnation of the polymerizable composition to glass cloths was good. The test and evaluation were conducted in the same manner as in Example 1 and results are shown in Table 1.

Comparative Example 3

The polymerizable composition was prepared in the same manner as in Example 1 with the exception that 3 parts of the hydroxyl group-containing polymer obtained in Synthesis Example 2 was used instead of 2.5 parts of the acid anhydride group-containing polymer obtained in Synthesis Example 1, and neither barium titanate nor the titanate coupling agent was used, and the flat plate-shaped crosslinked resin molded product and the double sided copper clad laminate were manufactured. Impregnation of the polymerizable composition to glass cloths was slow, which took a time more than twice spent in Example 1. The test and evaluation were conducted in the same manner as in Example 1 and results are shown in Table 1.

Comparative Example 4

The polymerizable composition was prepared in the same manner as in Example 1 with the exception that 2.5 parts of the acid anhydride group-containing polymer obtained in Synthesis Example 1 was not used, the amount of barium titanate was changed to 300 parts, and 3 parts of stearic acid was used instead of 2.5 parts of a titanate coupling agent, and the flat plate-shaped crosslinked resin molded product and the double sided copper clad laminate were manufactured. Impregnation of the polymerizable composition to glass cloths was good. The test and evaluation were conducted in the same manner as in Example 1 and results are shown in Table 1.

Comparative Example 5

The polymerizable composition was prepared in the same manner as in Example 1 with the exception that 300 parts of silica (SO-E2, manufactured by ADMATECHS CO., LTD) was used instead of 500 parts of barium titanate, the acid anhydride group-containing polymer obtained in Synthesis Example 1 was not used and the amount of the titanate coupling agent was changed to 3 parts, and the flat plate-shaped crosslinked resin molded product and the double sided copper clad laminate were manufactured. Impregnation of the polymerizable composition to glass cloths was slow. The test and evaluation were conducted in the same manner as in Example 1 and results are shown in Table 1.

adhesiveness to copper foil. When the polymer having the alicyclic structure, having the maleic anhydride group, having the acid value of 19 mgKOH/g, and having the number-average molecular weight of 1,250 (which are categorized as the acid anhydride group-containing polymer A), is used, an extremely great amount as large as 500 parts of the filler can be mixed into the composition and it was found that the molded product is excellent in all test and evaluation items with a high balance among them (Examples 1 to 3). It is understood that by using the acid anhydride group-containing polymer and the titanate coupling agent together, viscosity of the polymerizable composition is lower, and a high balance over all characteristics can be achieved (by comparison of Examples 1 and 2 with Example 3).

On the other hand, when no polymer of the component (C) is used, viscosity is too high if 500 parts of barium titanate is mixed, and the target molded product can not be obtained (Comparative Example 1), and a dielectric loss tangent and a linear expansion coefficient are larger to degrade heat resis-

TABLE 1

| | Components mixed*1 (in parts) | | | Test and evaluation | | | | | | |
|---|---|---|---|---|---|---|---|---|---|---|
| | (B) Component | (C) Component | Arbitrary additives | Viscosity (Pa · s) | Dielectric constant | Dielectric loss tangent | Linear expansion coefficient | Bubble inclusion | Heat resistance | Adherence |
| Example 1 | Barium titanate (500) | Acid anhydride group-containing polymer (2.5) | Titanate coupling agent (2.5) | 2.22 | 15 | ◎ | ◎ | ○ | ◎ | ◎ |
| Example 2 | Calcium titanate (500) | Acid anhydride group-containing polymer (2.5) | Titanate coupling agent (2.5) | 2.67 | 27 | ◎ | ◎ | ○ | ◎ | ◎ |
| Example 3 | Barium titanate (500) | Acid anhydride group-containing polymer (5) | — | 4.4 | 15 | ◎ | ◎ | ○ | ◎ | ◎ |
| Example 4 | Barium titanate (300) | Acid anhydride group-containing polymer (3) | — | 0.57 | 10 | ◎ | ○ | ○ | ◎ | ◎ |
| Example 5 | Silica (300) | Acid anhydride group-containing polymer (3) | — | 0.72 | 3 | ◎ | ◎ | ○ | ◎ | ◎ |
| Example 6 | Barium titanate (300) | Styrene-maleic anhydride copolymer (3) | — | 0.85 | 10 | ○ | ○ | ○ | ◎ | ◎ |
| Comparative example 1 | Barium titanate (500) | — | Titanate coupling agent (5) | 13.3 | — | — | — | — | — | — |
| Comparative example 2 | Barium titanate (300) | — | Titanate coupling agent (3) | 3.1 | 9 | Δ | X | ○ | X | X |
| Comparative example 3 | Barium titanate (300) | Hydroxyl group-containing polymer (3) | — | 6.65 | 9 | Δ | X | X | X | Δ |
| Comparative example 4 | Barium titanate (300) | — | Stearic acid (3) | 1.2 | 10 | X | X | ○ | X | X |
| Comparative example 5 | Silica (300) | — | Titanate coupling agent (3) | 5.53 | 3 | X | X | Δ | X | X |

Note
*1Since the cycloolefin monomer (A), the metathesis polymerization catalyst (D) and arbitrary additives except components shown in Table 1 were employed commonly in all of the examples and comparative examples, they were not described in the table.

As shown in Table 1, polymerizable compositions of the invention stated in Examples 1 to 6 are low in viscosity and molded products obtained by using the compositions are free of bubble inclusion, have dielectric characteristics high in dielectric constant and low in dielectric loss tangent, have high stability at high temperature because of low expansion coefficient and good heat resistance, and are excellent in tance and adhesiveness even if the amount of barium titanate is reduced to 300 parts or even if 300 parts of barium titanate is changed to 300 parts of silica (Comparative Examples 2 and 5). When the polymer having neither the carboxylic acid group nor the carboxylic anhydride group (the hydroxyl group-containing polymer) is used, the polymerizable composition is high in viscosity, and the molded product obtained has bubble inclusion, is high in linear expansion coefficient and is low both in heat resistance and adhesiveness (Comparative Example 3). Even if stearic acid was used instead of the component (C), the molded product was obtained that is high in dielectric loss tangent and linear expansion coefficient and low in heat resistance and adhesiveness (Comparative Example 4).

What is claimed is:

1. A polymerizable composition comprising:
   a cycloolefin monomer (A),
   a filler (B),
   a polymer (C) having a carboxyl group or a carboxylic anhydride group and having an acid value in the range of 0.1 to 100 mgKOH/g, and
   a metathesis polymerization catalyst (D).

2. The polymerizable composition according to claim 1, further comprising a chain transfer agent.

3. The polymerizable composition according to claim 1, further comprising a crosslinking agent.

4. The polymerizable composition according to claim 1, further comprising a chain transfer agent and a crosslinking agent.

5. A molded product obtained by bulk polymerization of the polymerizable composition as claimed in claim 1.

6. The molded product according to claim 5, obtained by coating the polymerizable composition on a supporting body, followed by bulk polymerization.

7. The molded product according to claim 5, obtained by injecting the polymerizable composition into a cavity of a forming mold, followed by bulk polymerization.

8. The molded product according to claim 5, obtained by impregnating a fiber reinforcement with the polymerization composition, followed by bulk polymerization.

9. A crosslinked resin molded product obtained by bulk polymerization of the polymerizable composition as claimed in claim 3, followed by crosslinking of the bulk polymer.

10. A crosslinked resin molded product obtained by heating and melting a molded product obtained by bulk polymerization of the polymerizable composition as claimed in claim 4 so as to be crosslinked, at the temperature higher than the peak temperature during the bulk polymerization.

11. A crosslinked resin composite obtained by laminating a molded product obtained by bulk polymerization of the polymerizable composition as claimed in claim 4 on a base material, followed by heating and melting the laminate.

* * * * *